(12) United States Patent
Setterberg, Jr.

(10) Patent No.: US 6,685,236 B2
(45) Date of Patent: Feb. 3, 2004

(54) HELICALLY WOUND EXPANDABLE TUBULAR INSERT

(75) Inventor: John Richard Setterberg, Jr., Huntsville, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 97 days.

(21) Appl. No.: 10/185,789

(22) Filed: Jun. 28, 2002

(65) Prior Publication Data

US 2004/0000791 A1 Jan. 1, 2004

(51) Int. Cl.⁷ ............... F16L 19/05; E21B 23/02
(52) U.S. Cl. ............ 285/318; 285/382; 285/382.4; 166/207
(58) Field of Search ............... 285/318, 382, 285/382.4; 166/207

(56) References Cited

U.S. PATENT DOCUMENTS

| | | | | | |
|---|---|---|---|---|---|
| 1,820,644 | A | * | 8/1931 | Bach | 279/99 |
| 2,341,670 | A | * | 2/1944 | Stinson | 285/334 |
| 2,407,552 | A | * | 9/1946 | Hoesel | 285/355 |
| 3,062,568 | A | * | 11/1962 | Andresen et al. | 285/333 |
| 3,105,556 | A | * | 10/1963 | Raulins | 166/214 |
| 3,419,079 | A | * | 12/1968 | Current | 166/206 |
| 4,491,351 | A | * | 1/1985 | Galle, Jr. et al. | 285/318 |
| 4,659,119 | A | * | 4/1987 | Reimert | 285/82 |
| 5,520,422 | A | * | 5/1996 | Friedrich et al. | 285/318 |
| 2003/0024708 | A1 | * | 2/2003 | Ring et al. | 166/380 |

* cited by examiner

*Primary Examiner*—Lynne H. Browne
*Assistant Examiner*—G M Collins
(74) *Attorney, Agent, or Firm*—Moser, Patterson & Sheridan, L.L.P.

(57) ABSTRACT

The present invention provides a connector arrangement for connecting a first tubular to a second tubular. In particular, the present invention relates to a method for connecting tubulars in such a way that the connection is prevented from becoming unmade in response to expansion of the tubulars in a wellbore. More particularly, the present invention provides a tubular connection using a helical or spiral thread insert to seal and maintain mechanical strength in a tubular connection after expansion.

17 Claims, 3 Drawing Sheets

HELICALLY WOUND EXPANDABLE TUBULAR INSERT

BACKGROUND OF THE INVENTION

1. Field of the Invention

The present invention generally relates to tubular connectors. In particular, the present invention relates to an apparatus for connecting tubulars in such a way that the connection is prevented from becoming unmade in response to expansion of the tubulars in a wellbore. More particularly, the present invention provides a tubular connection using a thread insert to maintain sealing and mechanical integrity in a tubular connection during and after expansion.

2. Description of the Related Art

In order to access hydrocarbons in subsurface formations, it is typically necessary to drill a bore into the earth. The process of drilling a borehole and of subsequently completing the borehole in order to form a wellbore requires the use of various tubular strings. These tubulars are typically run downhole where the mechanical and seal integrity of the jointed connections are critically important in the original make-up of the tubulars, during expansion of the tubulars, and after expansion of the tubulars.

Typically threaded connections are used to connect multiple tubular members end-to-end. This is usually accomplished by providing tubulars that have a simple male to female threaded connection. The male end is generally referred to as a pin, and the female end as a box. The tubulars are connected, or "made-up," by transmitting torque against one of the tubulars while the other tubular is typically held stationary. Torque is transmitted in a single direction in accordance with the direction corresponding with connection make-up. Any torque applied to the joint in the make-up direction will have the effect of continuing to tighten the threaded joint.

When running tubulars there is sometimes a requirement to run jointed tubulars that will later be expanded by various types of expansion mechanisms. In some instances, tubulars are expanded by the use of a cone-shaped mandrel. In this manner, the tubular is expanded by forcibly moving the cone through the expandable tubular, deforming the steel beyond its elastic limit while keeping the stresses below the ultimate yield. Alternatively, another recent method of expanding tubulars relies on rotary expander tools that have been developed to operate in response to hydraulic forces. The rotary expander tool typically includes radially expandable members that are urged outwardly, through fluid pressure, from a body of the expander tool and into contact with a tubular therearound. As sufficient pressure is generated on a piston surface behind these expansion members, the tubular being acted upon by the expander tool is expanded past its point of elastic deformation. In this manner, the inner and outer diameter of the tubular is increased in the wellbore. By rotating the expander tool and by moving the expander tool axially in the wellbore with the expansion members actuated, a tubular can be expanded into plastic deformation along a predetermined length.

Tubulars to be later expanded are typically run downhole where the mechanical and seal integrity of the connections, or joint, are critically important both in the original and expanded state of the tubular. The current method of making-up expandable tubulars is by the design of modified threaded connections which can be applied and handled in the same way as conventional oil-field tubulars, i.e., stabbed into each other and screwed together by right hand or left hand rotation and finally torqued to establish the seal integrity. This method of connecting tubulars, though a reliable means of connecting non-expanding tubulars, is proving to be problematic when these tubulars are expanded. The reasons for this being mainly due to the changes in geometry of the connection during expansion due to the stresses applied at the threads, or joint area. For instance, conventional tubulars expanded at the joint may disengage allowing the lower tubing to fall into the wellbore.

It is well known and understood that during the expansion of solid wall tubulars, the material in the tubing wall is plastically deformed in more than just the circumferential sense. In order for a tubular to increase in diameter by plastic deformation, the material to make-up the additional circumferential section of wall in the larger diameter must come from the tubing wall itself either by reduction in wall thickness or by reduction in tubular length or a combination of both. In a plain wall section of the tubular this process will normally take place in a relatively controlled and uniform way. However, at the point of a threaded connection, or joint, the changes in wall section, which are required in order to form an expandable threaded connection, introduce very complex and non-uniform stresses during and after expansion. These during-expansion stresses significantly change the thread form and compromise the connection integrity both in terms of its mechanical strength as well as in terms of its sealing capability.

Additionally, the larger elastic deformation caused by the reduced sections of the tubing wall at the roots of the thread will introduce much higher stresses than in other areas of the expanded tubular. This in turn may lead to joint failure due to these stresses approaching or exceeding the ultimate strength of the tubing material or by introduction of short cycle fatigue caused by the cyclic nature of some expansion processes being applied at these high stress levels.

In non-petroleum applications, thread inserts, in particular helical thread inserts, are employed as a means for repairing stripped, worn, or damaged threads. Briefly, where the threads in a bore are stripped or worn, repair is effected by drilling out the bore to remove remnants of the damaged threads, thereafter tapping the drilled out bore and then inserting in the tapped bore an insert, the outer diameter of which is intimately engaged in the threads of the re-tapped bore, the inner diameter of the insert providing a threaded pin receiver portion of the same size and pitch as that presented by the original threading of the bore. In addition to this method, wherein an insert is seated into the recesses of a box thread, the present invention envisions threading the pin threads of a tubular with an insert prior to make-up with a second tubular.

The objective of the present invention is to resolve many of the problematic areas associated with the expansion of threaded connections in wellbore tubulars. Preferably, the present invention consists of placing a helical or spiral thread insert in engagement with the threads of a first tubular before make-up with a second tubular. The insert bridges any gaps that naturally exist between the threads of a pin and the mating threads of a box. During expansion of the tubular joint, the insert is plastically deformed along with the threads such that a constant wall thickness is maintained. This innovative concept of using plastic deformation of an insert between the mating threads of a jointed system being described herein provides the essential step to making this invention a practical and novel solution to expandable wellbore tubular connections.

SUMMARY OF THE INVENTION

The present invention may be summarized as an improvement on expandable wellbore tubular connectors. In accordance with the invention, a metal insert, preferably helical or spiral in nature, is placed in engagement with the threads of a first tubular before make-up with the threads of a second tubular.

In operation, an insert is engaged between the threads of the tubulars prior to make-up of the tubulars. This may be accomplished by engaging the metal insert around the external threads, commonly referred to as a pin, of a first tubular before make-up with the internal threads, commonly referred to as a box, of a second tubular. As such, it may be desirable to have deeper recesses or grooves, and/or shallower teeth, within the thread profile of one or both of the tubulars.

In the preferred embodiment, a helically wound wire insert is formed around a tapered lead, however a straight lead is an alternative. In the tapered lead embodiment, the insert itself may be formed to carry any number of similar, or dissimilar internal or external thread profiles. As expansion of the threaded joint occurs, the wire insert will plastically deform within the area between the pin-threads and the box-threads to seal any gaps occurring in the thread profile due to internal expansion. The expansion of the insert may occur due to stretching, or drawing of its circumferential length as the thread connection is expanded, or through slippage, relative to the encapsulating box and pin profiles.

In another embodiment, the insert would be made from a work-hardenable corrosive resistance alloy. Additionally, the wire insert could be coated with Teflon, or some other inert sealing medium known to those in the arts. Such a coating would provide increased sealing benefits.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
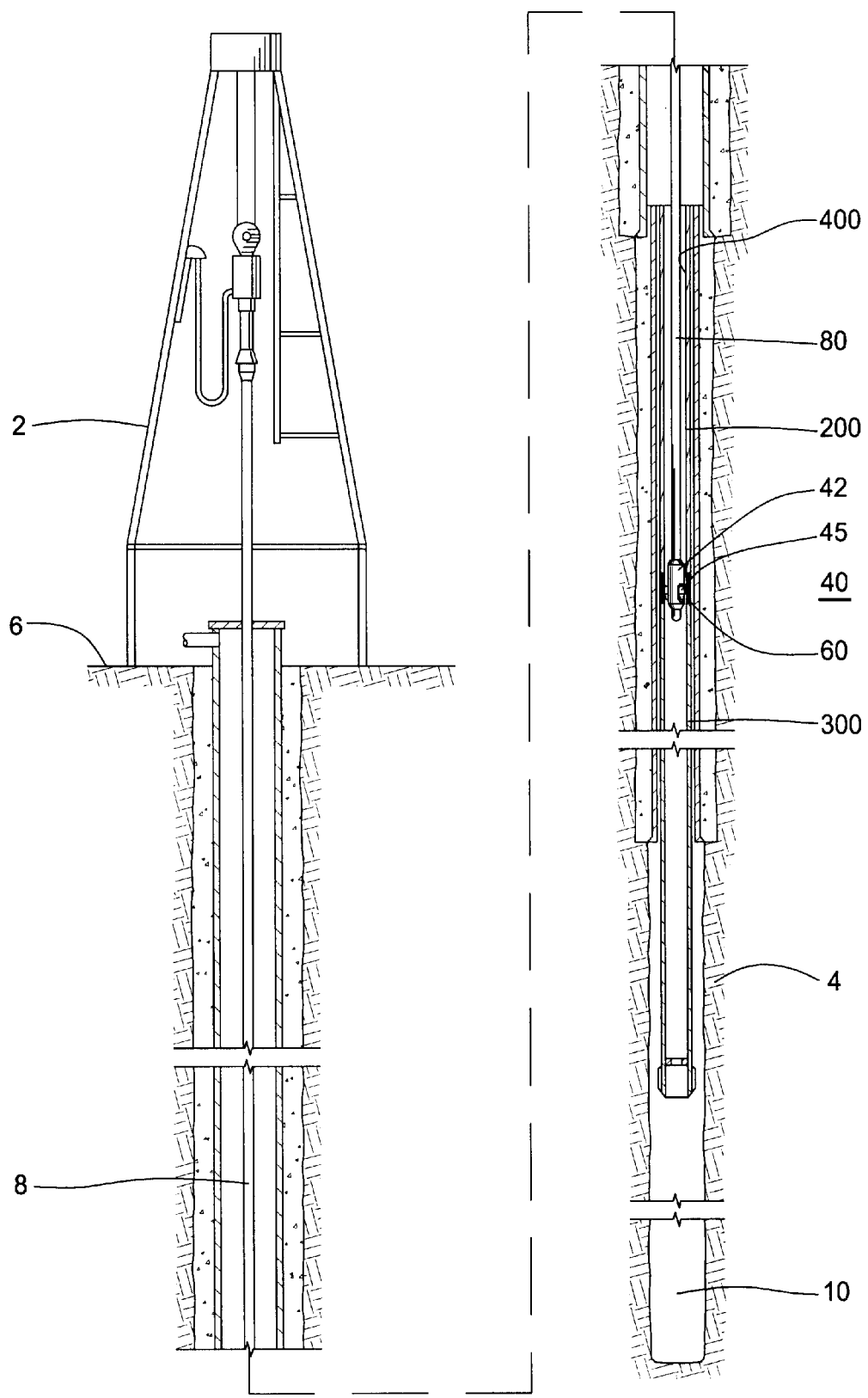
FIG. 1 is an elevation view of the present invention schematically showing the tubulars within a borehole and a representative expander tool at the jointed area.

Generally shown in FIG. 1 are some of the components of the system of the present invention. Visible are a representative rig 2, a borehole 10, a ground surface 6, a formation 4, a drill string or running string 8, a first tubular 200, a second tubular 300, a representative expander tool 40 comprising a body 42 and an expansion member 45, or roller, a bore 400 running through the tubulars, and an expandable make-up area, or joint area, of the first and second tubulars 60.

In operation the first 200 and second 300 tubulars would be mated together on the surface with the only deviation from normal stab-in and threading procedures being that of adding a wire insert (not shown) between the threads of the connection. After run-in, the tubulars could be expanded from within by any method known to those in the arts, and the connection or joint 60 of the tubulars would be capable of being expanding without losing its mechanical or sealing integrity.

As shown, a running tool with an expander element 40 or tool attached thereto would be run down the bore 400 of the tubulars. At a desired location, an operator would begin expanding the tubulars. When the expander tool 40 reaches the joint 60 of the two tubulars, the external threads, or pin threads, of the first tubular 200 would be compressed into the internal threads, or box threads, of the second tubular 300. The wire insert (not shown) that is located between the thread profiles of the two tubulars would be plastically deformed and would "fill-in" any gaps occurring during the expansion process, as well as, ensuring that a more-constant wall thickness is being expanded at the joint area.

In further description of the expander tool, the expander tool 40 has a body 42 that is hollow and generally tubular. The hollow body 42 allows the passage of fluids through the interior of the expander tool 40. The body 42 further has a plurality of recesses (not shown) to hold a respective roller 45, or expansion member. Each of the recesses has parallel sides and holds a roller 45 capable of extending radially from the radially perforated tubular core of the tool 40. In one embodiment of the expander tool 40, rollers 45 are near-cylindrical and slightly barreled. Each of the rollers 45 is supported by a shaft (not shown) at each end of the respective roller 45 for rotation about a respective rotational axis. The rollers 45 are generally parallel to the longitudinal axis of the tool 40. The plurality of rollers 45 may be radially offset at mutual circumferential separations around the central body 40. In the arrangement shown, only a single row of rollers 45 is employed. However, additional rows may be incorporated into the body 40. In addition, the arrangement of FIG. 1 presents three rollers spaced apart at 120-degree mutual intervals. However, other configurations may be used.

In further description of the expandable members, or rollers 45, the rollers 45 illustrated have generally cylindrical or barrel-shaped cross sections; however, it is to be appreciated that other roller shapes are possible. For example, a roller 45 may have a cross-sectional shape that is conical, truncated conical, semi-spherical, multifaceted, elliptical or any other cross sectional shape suited to the expansion operation to be conducted within the tubular's bore 400.

Each shaft is formed integral to its corresponding roller 45 and is capable of rotating within a corresponding piston (not shown). The pistons are radially slidable, one piston being slidably sealed within each radially extended recess. The backside of each piston is exposed to the pressure of fluid within the hollow bore of the tool 40. In this manner, pressurized fluid provided from the surface of the well can actuate the pistons and cause them to extend outwardly whereby the rollers 45 contact the inner surface, or bore 400, of the tubular to be expanded.

The expander tool 40 is preferably designed for use at or near the end of a working string 80. In order to actuate the expander tool 40, fluid is injected into the working string 80. Fluid under pressure then travels downhole through the working string 80 and into the perforated tubular bore of the tool 40. From there, fluid contacts the backs of the pistons. As hydraulic pressure is increased, fluid forces the pistons from their respective recesses. This, in turn, causes the rollers 45 to make contact with the inner surface of the tubular to be expanded. Fluid finally exits the expander tool 40 through a connector at the base of the tool 40. The circulation of fluids to and within the expander tool 40 is preferably regulated so that the contact between and the force applied to the inner wall of tubular 400 is controlled. The pressurized fluid causes the piston assembly to extend radially outward so as to place the rollers 45 into contact with the inner surface of the tubular 400. With a predetermined amount of fluid pressure acting on the piston surface, the tubulars are expanded past their elastic limits.

Figure 2:
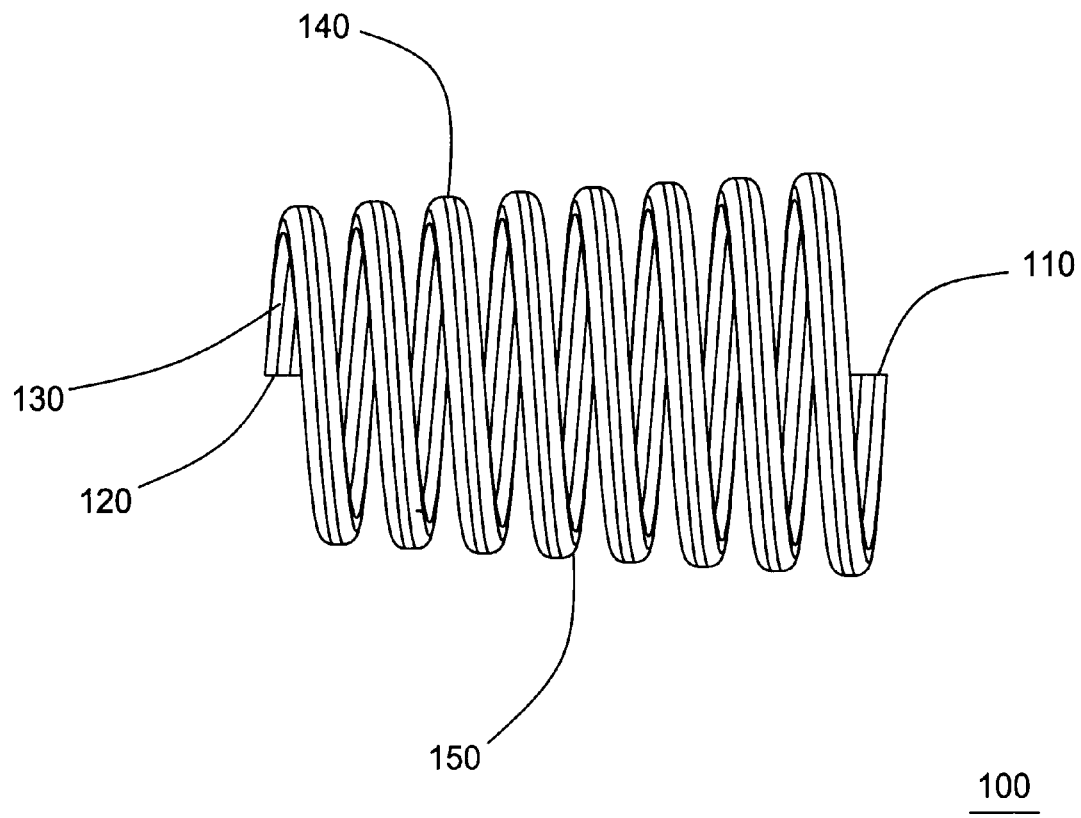
FIG. 2 is a side view of an insert of the present invention. As shown, the insert has ends with coils in between, wherein the inner diameter of the insert fits the thread profile of a tubular end having a pin or male connection, and wherein the outer diameter of the insert fits the thread profile of a tubular end having a box or female connection.

FIG. 2 is a side view of an insert 100 of the present invention. As shown, the insert has ends 110, 120 with coils 150 in between wherein an inner diameter 130 of the insert fits the thread profile of a first tubular end (not shown) having a pin or male connection, and wherein an outer diameter 140 of the insert fits the thread profile of a second tubular end (not shown) having a box or female connection.

In operation, the insert 100 is preferably mated and engaged around the external threads of a first tubular; however it is also envisioned that the process could happen with the insert 100 first being placed in engagement with the box thread profile of the second tubular prior to the pin threads of the first tubular being inserted therein. Preferably, the inner diameter 130 of the insert 100 engages the external threads, pin, of a first tubular in much the same way as a nut screws around the threads of a bolt. The outer diameter 140 of the insert 100 is designed such that a second tubular can be threaded around the insert 100 and pin thread combination. The outer diameter 140 thus mates with a corresponding thread profile of the second tubular (not shown). The outer diameter 140 may or may not make contact with the box threads during make-up.

Typically, the threaded insert is malleable in nature and is helically or spirally shaped. Malleability may come from the insert being metallic in composition. 4140 steel, 316 stainless, or an alloy such as Hastelloy G3 or Incoloy 825 are but a few examples of the possible materials that the insert may be comprised from. Depending upon wellbore and downhole fluid characteristics, the insert 100 could also be coated with Teflon or another inert sealing material known to those in the field in order to add another layer of sealing protection, especially for gas wells.

Figure 3:
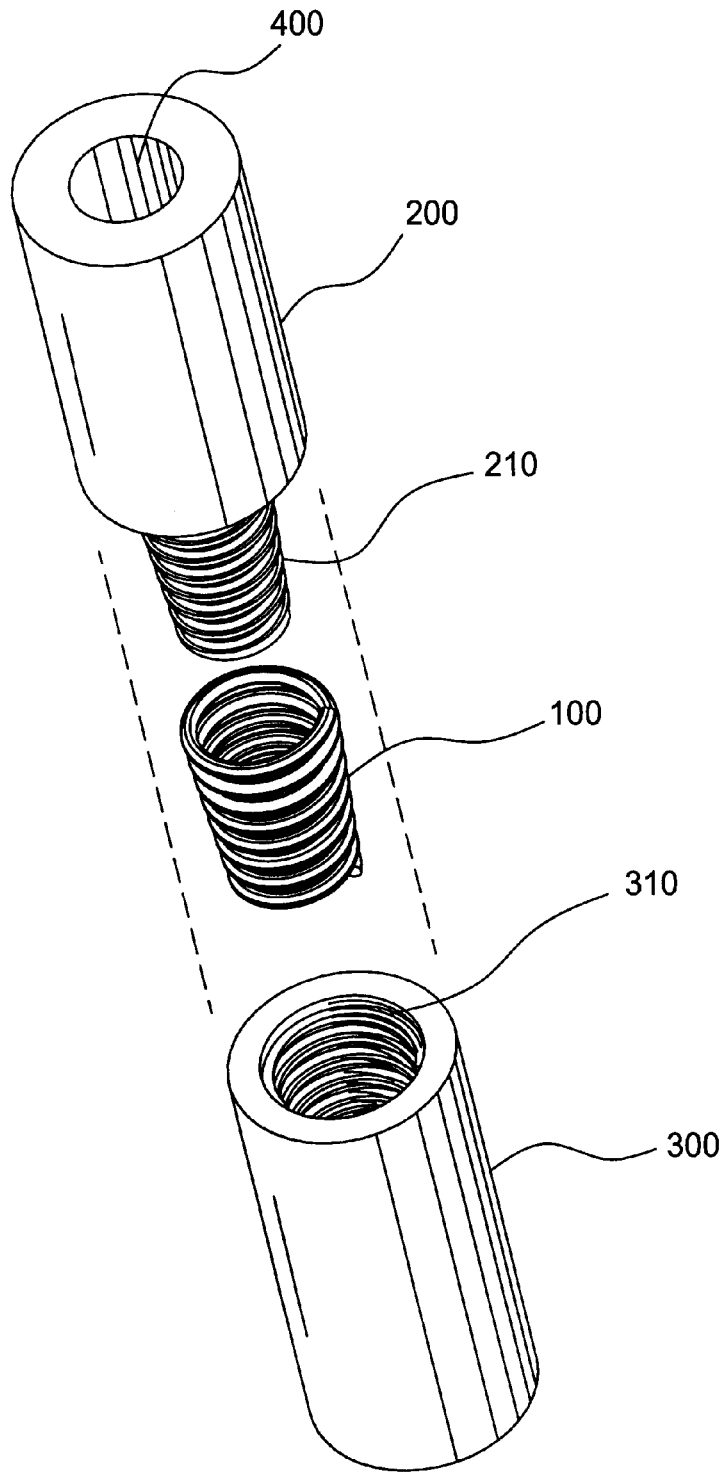
FIG. 3 is an isometric view of the insert showing the positioning of the insert in relationship to the two tubular members and their respective threads.

FIG. 3 is an isometric view of the insert showing the positioning of the insert in relationship to the tubular threads. Shown in FIG. 3 is the make-up orientation of the tubulars with the insert positioned between the pin 210 and box 310 threads of the two tubulars. Typically, the insert 100 would be wound or aligned around the pin threads 210 prior to connecting of the two tubulars.

After the tubulars 200, 300 are made-up they are ready to be run downhole. Expansion of the tubulars 200, 300 occurs within a wellbore, shown in FIG. 1, wherein an expanded tool plastically deforms the bore 400 of the tubulars 200, 300 to a predetermined size. When expanding the joint of the tubulars, the threads of the pin 210 and box 310 will plastically deform and force the insert 100 to maintain a mechanical and sealing relationship between the tubulars 200, 300.

The connection arrangement shown in FIGS. 2 and 3 are but one example of a connector of the present invention. Other arrangements and embodiments may be utilized within the spirit and scope of the present invention.

While the foregoing is directed to embodiments of the present invention, other and further embodiments of the invention may be devised without departing from the basic scope thereof, and the scope thereof is determined by the claims that follow.

What is claimed is:

1. A method of sealing a connection between two expandable tubulars comprising:
    installing an insert around external threads of a first expandable tubular prior to joining the first expandable tubular with internal threads of a second expandable tubular;
    threading the expandable tubulars to form a connection therebetween; and
    expanding the connection with a radial force, thereby retaining the seal between the tubulars.

2. The method of claim 1, wherein the insert is helically or spirally shaped.

3. The method of claim 2, wherein the insert is metallic.

4. The method of claim 3, wherein the insert is coated with a sealant.

5. A method of sealing a connection between two expandable tubulars comprising:
    installing an insert into internal threads of a first expandable tubular prior to joining the first expandable tubular with external threads of a second expandable tubular;
    threading the expandable tubulars to form a connection therebetween; and
    expanding the connection with a radial force, thereby retaining the seal between the tubulars.

6. The method of claim 5, wherein the insert is helically or spirally shaped.

7. The method of claim 6, wherein the insert is metallic.

8. The method of claim 7, wherein the insert is coated with a sealant.

9. A method for connecting expandable wellbore tubulars comprising:
    installing an insert around external threads of a first expandable tubular prior to joining the first expandable tubular with a second expandable tubular, wherein the first expandable tubular has an end with external threads and the second expandable tubular has an end with corresponding internal threads, the external threads of the first expandable tubular and the internal threads of the second expandable tubular forming a connection when mated;
    threading the expandable tubulars together;
    running the expandable tubulars downhole;
    running an expander tool through a bore of the expandable tubulars; and
    expanding the connection.

10. The method of claim 9, wherein the insert is helically or spirally shaped.

11. The method of claim 10, wherein the insert is metallic.

12. The method of claim 11, wherein the insert is coated with a sealant.

13. A method for connecting two expandable wellbore tubulars comprising:
    installing an insert around internal threads of a first expandable tubular prior to joining the first expandable tubular with a second expandable tubular, wherein the first expandable tubular has an end with internal threads and the second expandable tubular has an end with corresponding external threads, the internal threads of the first expandable tubular and the external threads of the second expandable tubular forming a connection when mated;

threading the expandable tubulars together;

running the expandable tubulars downhole;

running an expander tool through a bore of the expandable tubulars; and expanding the connection, thereby plastically deforming the insert and retaining a seal between the tubulars.

14. The method of claim 13, wherein the insert is helically or spirally shaped.

15. The method of claim 14, wherein the insert is metallic.

16. The method of claim 15, wherein the insert is coated with a sealant.

17. A method for expanding a connection in a wellbore, comprising:

running an assembly on a tubular string into the wellbore, the assembly including:
- a first expandable tubular having a connection means;
- a second expandable tubular having a mating connection means, the connection means and mating connection means constructed and arranged to form the connection between the tubulars; and
- a wire insert disposable within the connection;

applying an outward radial force to an inner surface of the connection; and expanding the connection radially outward, thereby deforming the connection past its elastic limits.

* * * * *